US007260405B2

(12) United States Patent
Kim et al.

(10) Patent No.: US 7,260,405 B2
(45) Date of Patent: Aug. 21, 2007

(54) METHOD FOR MEASURING AND REPORTING CHANNEL QUALITY IN A BROADBAND WIRELESS ACCESS COMMUNICATION SYSTEM

(75) Inventors: So-Hyun Kim, Suwon-si (KR); Chang-Hoi Koo, Seongnam-si (KR); Jung-Je Son, Seongnam-si (KR); Yeong-Moon Son, Anyang-si (KR)

(73) Assignee: Samsung Electronics Co., Ltd. (KR)

(*) Notice: Subject to any disclaimer, the term of this patent is extended or adjusted under 35 U.S.C. 154(b) by 158 days.

(21) Appl. No.: 10/835,158

(22) Filed: Apr. 29, 2004

(65) Prior Publication Data

US 2004/0219926 A1    Nov. 4, 2004

(30) Foreign Application Priority Data

Apr. 30, 2003    (KR)    ............ 10-2003-0027885

(51) Int. Cl.
*H04Q 7/20*    (2006.01)
(52) U.S. Cl. ............... 455/452.2; 455/438; 455/439; 455/450; 370/331
(58) Field of Classification Search ............ 455/452.2, 455/438, 439, 450; 370/331
See application file for complete search history.

(56) References Cited

U.S. PATENT DOCUMENTS 5,991,626 A * 11/1999 Hinz et al. ............ 455/436

FOREIGN PATENT DOCUMENTS

EP    1 081 979    3/2001
WO    WO99/43178    8/1999

OTHER PUBLICATIONS

Kitroser, "Handoff mechanism for IEEE 802.16e", Mar. 13, 2003.*
Kim et al. (Kim), "IEEE 802.16e Reporting of Scanning results", May 13, 2003.*
Kitroser, "IEEE 802.16e Handoff Draft", Mar. 13, 2003.
Kim et al., "IEEE 802.16e Reporting of Scanning Results", May 13, 2003.

* cited by examiner

*Primary Examiner*—Jean Gelin
*Assistant Examiner*—Pierre-Louis Desir
(74) *Attorney, Agent, or Firm*—The Farrell Law Firm

(57) ABSTRACT

A method for measuring/reporting a channel quality in a broadband wireless access communication system. The method for reporting channel qualities of active BS and neighbor BSs measured by an MSS to the active BS when the MSS exists in a specific area covered by the active BS and neighbor BSs in a communication system includes the steps of: a) receiving channel quality report information indicative of channel periods of the channel qualities from the active BS, and receiving channel quality measurement information associated with individual channel qualities of the neighbor BSs and the active BS from the active BS; b) measuring SINRs of the neighbor BSs and the active BS according to the channel quality measurement information; and c) reporting the measured SINRs of the neighbor BSs and the active BS to the active BS.

16 Claims, 9 Drawing Sheets

METHOD FOR MEASURING AND REPORTING CHANNEL QUALITY IN A BROADBAND WIRELESS ACCESS COMMUNICATION SYSTEM

PRIORITY

This application claims priority to an application entitled "METHOD FOR MEASURING/REPORTING CHANNEL QUALITY IN BROADBAND WIRELESS ACCESS COMMUNICATION SYSTEM", filed in the Korean Intellectual Property Office on Apr. 30, 2003 and assigned Serial No. 2003-27885, the contents of which are hereby incorporated by reference.

BACKGROUND OF THE INVENTION

1. Field of the Invention

The present invention relates generally to a broadband wireless access communication system, and more particularly to a method for measuring and reporting a channel quality in a broadband wireless access communication system for use with an OFDM (Orthogonal Frequency Division Multiplexing) scheme.

2. Description of the Related Art

A great deal of intensive research has been conducted on the 4G (4th Generation) communication system as one of the next generation communication systems to provide a plurality of users with a specific service having a variety of QoSs (Quality of Services) at a transfer rate of about 100 Mbps. Presently, the 3G (3rd Generation) communication system provides a transfer rate of about 384 kbps in an outdoor channel environment having a relatively poor channel environment, and provides a maximum transfer rate of about 2 Mbps in an indoor channel environment having a relatively good channel environment. A wireless Local Area Network (LAN) system and a wireless Metropolitan Area Network (MAN) system have been designed to provide a transfer rate of 20~50 Mbps. Further, a new communication system based on the 4G communication system has been developed to provide the wireless LAN and MAN systems for guaranteeing a relatively high transfer rate with mobility and QoS. As a result, many developers have conducted intensive research into a high-speed service to be provided from the 4G communication system.

However, the wireless MAN system is suitable for a high-speed communication service in that it has a wide coverage and supports a high-speed transfer rate, but it does not consider the mobility of a subscriber station (SS). Consequently, there is no consideration of a handover operation caused by the high-speed movement of the SS. The communication system currently considered in the IEEE (Institute of Electrical and Electronics Engineers) 802.16a specification acts as a specific communication system for performing a ranging operation between the SS and a base station (BS). FIG.

FIG. 1 is a block diagram illustrating a broadband wireless access communication system using an OFDM/OFDMA (Orthogonal Frequency Division Multiplexing/Orthogonal Frequency Division Multiple Access) scheme. More specifically, FIG. 1 depicts the IEEE 802.16a communication system.

The wireless MAN system acting as a BWA (Broadband Wireless Access) communication system has a much wider coverage and a much higher transfer rate than the wireless LAN system. When adapting the OFDM scheme and the OFDMA scheme to a physical channel of the wireless MAN system to provide the wireless MAN system with a broadband transmission network, this application system is called an IEEE 802.16a communication system. The IEEE 802.16a communication system applies the OFDM/OFDMA scheme to the wireless MAN system, such that it transmits a physical channel signal using a plurality of sub-carriers, resulting in high-speed data transmission.

The IEEE 802.16e communication system has been designed to consider the SS's mobility in the IEEE 802.16a communication system, and there is no detailed specification for the IEEE 802.16e communication system. The IEEE 802.16a communication system and the IEEE 802.16e communication system act as a broadband wireless access communication system for use with the OFDM/OFDMA schemes. For the convenience of description, the IEEE 802.16a communication system will be adapted as an example.

Referring to FIG. 1, the IEEE 802.16a communication system has a single cell structure, and comprises a BS 100 and a plurality of SSs 110, 120, and 130, which are managed by the BS 100. Signal transmission/reception among the BS 100 and the SSs 110, 120, and 130 can be established using the OFDM/OFDMA scheme. FIG.

FIG. 2 is a conceptual diagram illustrating the downlink frame structure for use in the BWA communication system using the OFDM/OFDMA scheme. More specifically, FIG. 2 depicts a downlink frame structure for use in the IEEE 802.16a/IEEE 802.16e communication system.

Referring to FIG. 2, the downlink frame includes a preamble field 200, a broadcast control field 210, and a plurality of TDM (Time Division Multiplexing) fields 220 and 230. A synchronous signal (i.e., a preamble sequence) for synchronizing the BS and the SSs is transmitted via the preamble field 200. The broadcast control field 210 includes a DL(DownLink)_MAP field 211 and a UL(UpLink)_MAP field 213. The DL_MAP field 211 transmits the DL_MAP message. A plurality of IEs (Information Elements) contained in the DL_MAP message are shown in Table 1 below.

TABLE 1

| Syntax | Size | Notes |
|---|---|---|
| DL_MAP_Message_Format( ){ | | |
| Management Message Type=2 | 8 bits | |
| PHY Synchronization Field | Variable | See Appropriate PHY specification |
| DCD Count | 8 bits | |
| Base Station ID | 48 bits | |
| Number of DL_MAP Element n | 16 bits | |
| Begin PHY Specific section { | | See Applicable PHY section |
| For (i=1; i<=n; i++) | | For each DL_MAP element 1 to n |
| DL_MAP Information Element( ) | Variable | See corresponding PHY specification |
| if!(byte boundary) { Padding Nibble } } } } | 4 bits | Padding to reach byte boundary |

Referring to Table 1, the DL_MAP message includes a Management Message Type field including a plurality of IEs (i.e., transmission message type information); a PHY (PHYsical) Synchronization field established in response to a modulation or demodulation scheme applied to a physical channel in order to perform synchronization acquisition; a DCD count field including count information in response to a DCD (Downlink Channel Descript) message configuration variation containing a downlink burst profile; a Base Station ID field including a Base Station Identifier; and a Number of DL_MAP Element n field including the number of elements found after the Base Station ID. Particularly, the DL_MAP message (not shown in Table 1) includes information associated with ranging codes allocated to individual ranging processes to be described later.

The UL_MAP field 213 transmits the UL_MAP message. A plurality of IEs contained in the UL_MAP message are shown in Table 2 below.

TABLE 2

| Syntax | Size | Notes |
|---|---|---|
| UL_MAP_Message_Format( ){ | | |
| Management Message Type=3 | 8 bits | |
| Uplink Channel ID | 8 bits | |
| UCD Count | 8 bits | |
| Number of UL_MAP Element n | 16 bits | |
| Allocation Start Time | 32 bits | |
| Begin PHY Specific section { | | See Applicable PHY section |
| for (I=1; i<=n; i++) | | For each DL_MAP element 1 to n |
| UL_MAP Information_Element( ) | Variable | See corresponding PHY specification |
| } | | |
| } | | |
| } | | |

Referring to Table 2, the UL_MAP message includes a Management Message Type field including a plurality of IEs (i.e., transmission message type information); an Uplink Channel ID field including a used Uplink Channel ID; a UCD (Uplink Channel Descript) count field including count information in response to a UCD message configuration variation containing an uplink burst profile; and a Number of UL_MAP Element n field including the number of elements found after the UCD count field. In this case, the uplink channel ID can only be allocated to a Media Access Control (MAC) sub-layer.

The TDM fields 220 and 230 are timeslots using a TDM/TDMA (Time Division Multiple/Time Division Multiple Access) scheme. The BS transmits broadcast information to be broadcast to SSs managed by the BS over the DL_MAP field 211 using a predetermined center carrier. The SSs monitor all the frequency bands having been previously allocated to individual SSs upon receipt of a power-on signal, such that they detect a pilot channel signal having a highest signal intensity, i.e., the highest SINR (Signal to Interference and Noise Ratio). It is determined that the SS belongs to a specific BS, which has transmitted the pilot channel signal with the highest SINR. The SSs check the DL_MAP field 211 and the UL_MAP field 213 of the downlink frame transmitted from the BS, such that they recognize their own uplink and downlink control information and specific information for indicating a real data transmission/reception position.

The aforementioned UCD message configuration is shown in Table 3 below.

TABLE 3

| Syntax | Size | Notes |
|---|---|---|
| UCD-Message_Format( ){ | | |
| Management Message Type=0 | 8 bits | |
| Unlink channel ID | 8 bits | |
| Configuration Change Count | 8 bits | |
| Mini-slot size | 8 bits | |

TABLE 3-continued

| Syntax | Size | Notes |
|---|---|---|
| Ranging Backoff Start | 8 bits | |
| Ranging Backoff End | 8 bits | |
| Request Backoff Start | 8 bits | |
| Request Backoff End | 8 bits | |
| TLV Encoded Information for the overall channel | Variable | |
| Begin PHY Specific Section { | | |
| for (I=1; i<n; i+n) | | |
| Uplink_Burst_Descriptor | Variable | |
| } | | |
| } | | |
| } | | |

Referring to Table 3, the UCD message includes a Management Message Type field including a plurality of IEs (i.e., transmission message type information); an Uplink Channel ID field including a used Uplink Channel Identifier; a Configuration Change Count field counted by the BS; a mini-slot size field including the size of the mini-slot of the uplink physical channel; a Ranging Backoff Start field including a backoff start point for an initial ranging process, i.e., an initial backoff window size for the initial ranging process; a Ranging Backoff End field including a backoff end point for the initial ranging process, i.e., a final backoff window size; a Request Backoff Start field including a backoff start point for establishing contention data and requests, i.e., an initial backoff window size; and a Request Backoff End field including a backoff end point for establishing contention data and requests, i.e., a final backoff window size. In this case, the backoff value indicates a kind of standby time which is a duration time between the start of SS's access failure and the start of SS's re-access time. If the SS fails to execute an initial ranging process, the BS must transmit the backoff values indicative of standby time information for which the SS must wait for the next ranging process to the SS. For example, provided that a specific number of 10 is determined by the "Ranging Backoff Start" and "Ranging Backoff End" fields shown in the Table 3, the SS must pass over $2^{10}$ access executable chances (i.e., 1024 access executable chances) and then execute the next ranging process according to the Truncated Binary Exponential Backoff Algorithm.

FIG. 3 is a conceptual diagram illustrating an uplink frame structure for use in a BWA communication system using an OFDM/OFDMA scheme. More specifically, FIG. 3 depicts an uplink frame structure for use in the IEEE 802.16a communication system.

Prior to describing the uplink frame structure illustrated in FIG. 3, three ranging processes for use in the IEEE 802.16a communication system, i.e., an initial ranging process, a maintenance ranging process (also called a period ranging process), and a bandwidth request ranging process will hereinafter be described in detail.

The initial ranging process for establishing synchronization acquisition between the BS and the SS establishes a correct time offset between the SS and the BS, and controls a transmission power (also called a transmit power). More specifically, the SS is powered on, and receives the DL_MAP message, the UL_MAP message, and the UCD message to establish synchronization with the BS in such a way that it performs the initial ranging process to control the transmission power between the BS and the time offset. In this case, the IEEE 802.16a communication system uses the OFDM/OFDMA scheme, such that the ranging procedure requires a plurality of ranging sub-channels and a plurality of ranging codes. The BS allocates available ranging codes to the SS according to objectives of the ranging processes (i.e., the ranging process type information). This operation will hereinafter be described in more detail.

The ranging codes are created by segmenting a PN (Pseudorandom Noise) sequence having a length of $2^{15}-1$ bits into predetermined units. Typically, one ranging channel is composed of two ranging sub-channels each having a length of 53 bits, PN code segmentation is executed over the ranging channel having the length of 106 bits, resulting in the creation of a ranging code. A maximum of 48 ranging codes RC#1~RC#48 can be assigned to the SS. More than two ranging codes for every SS are applied as a default value to the three ranging processes having different objectives, i.e., an initial ranging process, a period ranging process, and a bandwidth request ranging process. In this way, a ranging code is differently assigned to the SS according to each objective of the three ranging processes. For example, N ranging codes are assigned to the SS for the initial ranging process as denoted by a prescribed term of "N RC (Ranging Codes) for Initial Ranging", M ranging codes are assigned to the SS for the periodic ranging process as denoted by a prescribed term of "M RCs for maintenance ranging", and L ranging codes are assigned to the SS for the bandwidth request ranging process as denoted by a prescribed term of "L RCs for BW-request ranging". The assigned ranging codes are transmitted to the SSs using the DL_MAP message, and the SSs perform necessary ranging procedures using the ranging codes contained in the DL_MAP message.

The period ranging process is periodically executed such that an SS which has controlled a time offset between the SS and the BS and a transmission power in the initial ranging process can control a channel state associated with the BS. The SS performs the period ranging process using the ranging codes assigned for the period ranging process.

The bandwidth request ranging process enables the SS, which has controlled a time offset between the SS and the BS and a transmission power in the initial ranging process, to request a bandwidth allocation from the BS in such a way that the SS can communicate with the BS.

Referring to FIG. 3, the uplink frame includes an initial maintenance opportunity field 300 using the initial and period ranging processes, a request contention opportunity field 310 using the bandwidth request ranging process, and an SS scheduled data field 320 including uplink data of a plurality of SSs. The initial maintenance opportunity field 300 includes a plurality of access burst fields each having initial and period ranging processes, and a collision field in which there is a collision between the access burst fields. The request contention opportunity field 310 includes a plurality of bandwidth request fields each having a real bandwidth request ranging process, and a collision field in which there is a collision between the bandwidth request ranging fields. The SS scheduled data fields 320 each include a plurality of SS scheduled data fields (i.e., SS 1 scheduled data field~SS N scheduled data field). The SS transition gap is positioned between the SS scheduled data fields (i.e., SS 1 scheduled data field~SS N scheduled data field).

The UIUC (Uplink Interval Usage Code) area records information identifying the usage of offsets recorded in the offset area. For example, provided that 2 is recorded in the UIUC area, a starting offset for use in the initial ranging process is recorded in the offset area. When 3 is recorded in the UIUC area, a starting offset for use in either the bandwidth request ranging or the maintenance ranging process is recorded in the offset area. The offset area records a starting offset value for use in either the initial ranging process or the maintenance ranging process according to the information recorded in the UIUC area. Physical channel characteristic information to be transferred from the UIUC area is recorded in the UCD.

As described above, the IEEE 802.16a communication system has considered a fixed state of a current SS (i.e., there is no consideration given to the mobility of the SS) and a single cell structure. However, the IEEE 802.16e communication system has been defined as a system for considering the SS's mobility in the IEEE 802.16a communication system, such that the IEEE 802.16e communication system must consider the SS's mobility in a multi-cell environment. In order to provide the SS's mobility in the multi-cell environment, individual operations modes of the SS and the BS must be converted. More specifically, many developers have conducted intensive research into an SS handover system considering a multi-cell structure to provide the SS's mobility.

As such, in order to enable the IEEE 802.16e communication system to support a handover function, the SS must measure SINRs of pilot signals transferred from neighbor BSs and an active BS to which the SS currently belong. When the SINR of the pilot signal transferred from the active BS is lower than SINRs of pilot signals transferred from the neighbor BSs, the SS transmits a handover request to the active BS. A method for controlling a mobile SS to measure the SINRs of the pilot signals transferred from the active BS and the neighbor BSs in the IEEE 802.16e communication system will be described later in more detail with reference to FIG. 4. In this case, the expression "Pilot signal's SINR measurement" is called a "Pilot signal's SINR scan or scanning" for the convenience of description. It should be noted that the term "Scan" is substantially equal to the other term "Scanning".

FIG. 4 is a flow chart illustrating a method for measuring SINRs of pilot signals transferred from the active BS and the neighbor BSs in a broadband wireless access communication system for use with a conventional OFDM/OFDMA scheme. More specifically, the method for measuring SINRs of pilot signals transferred from the active BS and the neighbor BSs in the IEEE 802.16e communication system is illustrated in FIG. 4.

However, prior to describing FIG. 4, as indicated above, the IEEE 802.16e communication system considers the mobility of SSs in the IEEE 802.16a communication system. The SS with the mobility in the IEEE 802.16e communication system is called an MSS (Mobile Subscriber Station).

Referring to FIG. 4, the BS 450 transmits an NBR_ADV (Neighbor BSs Advertisement) message to the MSS 400 at step 411. The detailed configuration of the NBR_ADV message is shown in Table 4 below.

TABLE 4

| Syntax | Size | Notes |
|---|---|---|
| NBR_ADV Message_Format( ){ | | |
|   Management Message Type=? | 8 bits | |
|   N_NEIGHBORS | 8 bits | |
|   For(i=0;j<N_NEIGHBORS;j++){ | | |
|     Neighbor BS-ID | 48 bits | |
|     Configuration Change Count | 8 bits | |
|     Physical Frequency | 16 bits | |
|     TLV Encoded Neighbor Information | Variable | TLV specific |
|   } | | |
| } | | |

Referring to Table 4, the NBR_ADV message includes a Management Message Type field including transmission message type information; an N_NEIGHBORS field including the number of neighbor BSs; a neighbor BS-ID field including ID information of the neighbor BSs; a Configuration Change Count field including the number of configuration changes; a physical frequency field including physical channel frequencies of the neighbor BSs; and a TLV (Type/Length/Value) Encoded Neighbor Information field including other information associated with neighbor BSs other than the above described information. It should be noted that the Management Message Type field to which the NBR_ADV message will be transmitted is currently in an undecided state, as denoted by "Management Message Type=? (undecided)".

The MSS 400 that is receiving the NBR_ADV message transmits a SCAN_REQ (Scan Request) message to the BS 450 when it wishes to scan SINRs of pilot signals transferred from the neighbor BSs at step 413. In this case, the time at which the MSS 400 generates a scan request is not directly associated with the pilot SINR scanning operation, such that its detailed description will herein be omitted.

The SCAN_REQ message configuration is shown in Table 5 below.

TABLE 5

| Syntax | Size | Notes |
| --- | --- | --- |
| SCN_REQ Message_Format( ){ | | |
| Management Message Type=? | 8 bits | |
| Scan Duration | 20 bits | For SCa PHY, units are mini-slots. For OFDM/OFDMA PHY, units are OFDM symbols |
| } | | |

Referring to Table 5, the SCAN_REQ message includes a Management Message Type field including a plurality of IEs (i.e., transmission message type information), and a Scan Duration field including a scan-desired scan duration for SINRs of pilot signals transferred from the neighbor BSs. If the IEEE 802.16e communication system is a system for use with a Single Carrier (SC), i.e., if the scan duration field is applied to an SC physical channel, the scan duration field is configured in units of mini-slots. If the IEEE 802.16e system acts as the OFDM/OFDMA system, i.e., if the IEEE 802.16e system is applied to the OFDM/OFDMA physical channel, it is configured in the form of OFDM-symbol units. It should be noted that the Management Message Type field to which the SCAN_REQ message will be transmitted is currently in an undecided state, as denoted by "Management Message Type=? (undecided)".

The BS 450 receiving the SCAN_REQ message transmits a DL_MAP message including information to be scanned by the MSS 400 to the MSS 400 at step 415. In this case, the SCANNING_IE message including scan information contained in the DL_MAP message is shown in Tables 6, 7, and 8 below.

TABLE 6

For SCa PHY:

| Syntax | Size | Notes |
| --- | --- | --- |
| Scanning_IE { | | |
| CID | 16 bits | MSS basic CID |
| Scan Start | 22 bits | Offset (in units of mini-slots) to the start of the scanning interval from the mini-slot boundary specified by the downlink Allocation_Start_Time |

TABLE 6-continued

For SCa PHY:

| Syntax | Size | Notes |
| --- | --- | --- |
| Scan Duration | 22 bits | Duration (in units of mini-slots) where the MSS may scan for neighbor BS |
| } | | |

Referring to Table 6, the SCANNING_IE message includes scan information for use in the SC physical channel. Parameters contained in the SCANNING_IE message are a CID (Connection ID), a Scan Start value, and a scan duration value. The CID includes an MSS basic CID for use with the SCANNING_IE message. The Scan Start value is a predetermined time at which the MSS begins a pilot SINR scanning operation. The scan duration is a predetermined interval during which the MSS performs the pilot SINR scanning operation. The scan start and scan duration values for use in the SC physical channel are configured in the form of mini-slot units.

TABLE 7

For OFDM PHY:

| Syntax | Size | Notes |
| --- | --- | --- |
| Scanning_IE { | | |
| CID | 16 bits | MSS basic CID |
| Scan Start | 18 bits | Indicate the scanning interval start time, in units of OFDM symbol duration, relative to the start of the first symbol of the PHY PDU (including preamble) where the DL_MAP message is transmitted |
| Scan Duration | 18 bits | Duration (in units of OFDM symbols) where the MSS may scan for neighbor BS |
| } | | |

Referring to Table 7, the SCANNING_IE message includes scan information for use in the OFDM physical channel. Parameters contained in the SCANNIG_IE message are a CID (Connection ID), a Scan Start value, and a scan duration value. The CID indicates an MSS basic CID for use with the SCANNING_IE message. The Scan Start value is a predetermined time at which the MSS begins a pilot SINR scanning operation. The scan duration is a predetermined interval during which the MSS performs the pilot SMIR scanning operation. The scan start and scan duration values for use in the OFDM physical channel are configured in the form of OFDM-symbol units.

TABLE 8

For OFDM PHY:

| Syntax | Size | Notes |
| --- | --- | --- |
| Scanning_IE { | | |
| CID | 16 bits | MSS basic CID |
| Scan Start | 18 bits | The offset of the OFDM symbol in which the scanning interval starts. Measured in OFDM symbols from the time specified by the Allocation_Start_time_Field in the DL_MAP |

TABLE 8-continued

For OFDM PHY:

| Syntax | Size | Notes |
| --- | --- | --- |
| Scan Duration | 18 bits | Duration (in units of OFDM symbols) where the MSS may scan for neighbor BS |
| } | | |

Referring to Table 8, the SCANNING_IE message includes scan information for use in the OFDMA physical channel. Parameters contained in the SCANNIG_IE message are a CID (Connection ID), a Scan Start value, and a scan duration value. The CID includes an MSS basic CID for use with the SCANNING_IE message. The Scan Start value is a predetermined time at which the MSS begins a pilot SINR scanning operation. The scan duration is a predetermined interval during which the MSS performs the pilot SINR scanning operation. The scan start and scan duration values for use in the OFDM physical channel are configured in the form of OFDM-symbol units.

The MSS 400, having received the DL_MAP message including the scanning_IE message, scans pilot SINRs associated with neighbor BSs recognized by the NBR_ADV message according to parameters contained in the SCANNING_IE message at step 417. It should be noted that SINRs of pilot signals transferred from the neighbor BSs and the SINR of the pilot signal transferred from the BS 450 to which the MSS 400 currently belongs are continuously scanned, even though it is not illustrated in FIG. 4.

FIG. 5 is a flow chart illustrating a handover request process of an MSS in a broadband wireless access communication system for use with a conventional OFDM/OFDMA scheme. More specifically, an MSS handover request process for use in the IEEE 802.16e communication system is illustrated in FIG. 5.

Referring to FIG. 5, the BS 550 transmits an NBR_ADV message to the MSS 500 at step 511. The MSS 500, having received the NBR_ADV message, transmits a SCAN_REQ message to the BS 550 when it wishes to scan SINRs of pilot signals transferred from the neighbor BSs at step 513. In this case, the time at which the MSS 500 generates a scan request is not directly associated with the pilot SINR scanning operation, such that its detailed description will herein be omitted. The BS 550, having received the SCAN_REQ message, transmits a DL_MAP message including the SCANNING_IE message (i.e., information to be scanned by the MSS 500) to the MSS 500 at step 515. In association with the neighbor BSs recognized by the NBR_ADV message, the MSS 500, having received the DL_MAP message including the SCANNING_IE message, scans SINRs of pilot signals in response to parameters (i.e., a scan start value and a scan duration) contained in the SCANNING_IE message at step 517. It should be noted that SINRs of pilot signals transferred from the neighbor BSs and the SINR of the pilot signal transferred from the BS 550 to which the MSS 500 currently belongs are continuously scanned, even though it is not illustrated in FIG. 5.

If it is determined that the MSS 500 must change its current active BS to another BS at step 519, after the scanning operations of the SINRs of pilot signals received from the neighbor BSs have been completed, i.e., if it is determined that the MSS 500 must change its current active BS to a new BS, the MSS 500 transmits an MSSHO_REQ (Mobile Subscriber Station HandOver Request) message to the BS 550 at step 521. The MSSHO_REQ message configuration is shown in Table 9 below.

TABLE 9

| Syntax | Size | Notes |
| --- | --- | --- |
| MSSHO_REQ Message_Format( ){ | | |
| Management Message Type=? | 8 bits | |
| Estimated HO time | 8 bits | |
| N_Recommended | 8 bits | |
| For(i=0;j<N_NEIGHBORS;j++){ | | |
| Neighbor BS-ID | 48 bits | |
| BS S/(N+I) | 8 bits | |
| } | | |
| } | | |

Referring to Table 9, the MSSHO_REQ message includes a Management Message Type field identifying a plurality of IEs (i.e., transmission message type information), an estimated HO time field including a handover start time, and an N_Recommended field including the scanning result of the MSS. In this case, the N_Recommended field includes ID information of neighbor BSs and SINR information of pilot signals of the neighbor BSs. It should be noted that the Management Message Type field to which the MSSHO_REQ message will be transmitted is currently in an undecided state, as denoted by "Management Message Type=? (undecided)".

After transmitting the MSSHO_REQ message to the BS 550, the MSS 500 re-scans SINRs of pilot signals in association with the neighbor BSs at step 523.

First and second problems of the MSS scanning operation for use in the IEEE 802.16e communication system will now be described herein below.

In the first problem, although the MSS scans pilot SINRs of neighbor BSs in response to the scanning information received from the active BS, there is no procedure for additionally reporting the pilot SINR scanning result of the active BS and neighbor BSs. In the second problem, there is no procedure for enabling the MSS to scan pilot SINRs of neighbor BSs before the MSS transmits a scan request to the active BS.

In order to enable the IEEE 802.16e communication system to support a handover function of the MSS, a handover function of a mobile subscriber must be made available upon receipt of a request signal from the MSS and a request signal from the BS. In order to enhance system efficiency, it is desirable that the BS continues to manage the pilot SINR scanning state (i.e., the MSS state) after the MSS has been powered on. However, the IEEE 802.16e communication system cannot report an MSS handover procedure and an MSS pilot SINR scanning state upon receiving a request signal from the BS, such that there must be newly developed such procedures for reporting the MSS handover procedure and the MSS pilot SINR scanning state.

SUMMARY OF THE INVENTION

Accordingly, the present invention has been designed in view of the above and other problems, and it is an object of the present invention to provide a method for measuring and reporting a channel quality in a broadband wireless access communication system.

It is another object of the present invention to provide a method for measuring a channel quality in a broadband wireless access communication system even though there is no additional request from a mobile subscriber.

It is yet another object of the present invention to provide a method for performing a handover function in response to a channel quality in a broadband wireless access communication system.

In accordance with one aspect of the present invention, the above and other objects are accomplished by a method for measuring channel qualities of an active BS (Base Station) and neighbor BSs when an MSS (Mobile Subscriber Station) is located in an area covered by the active BS and neighbor BSs in a communication system including the MSS (Mobile Subscriber Station), the active BS for providing the MSS with a desired service, and a plurality of BSs adjacent to the active BS, comprising the steps of: a) controlling the active BS to transmit channel quality measurement information needed for the MSS to measure channel qualities of the active BS and neighbor BSs to the MSS; b) controlling the active BS to transmit channel quality measurement information, and transmitting neighbor BS-associated information indicative of information associated with the neighbor BSs to the MSS; and c) controlling the MSS to measure a channel quality according to the channel quality measurement information in association with the active BS and the neighbor BSs associated with the neighbor BS-associated information.

In accordance with another aspect of the present invention, there is provided a method for reporting channel qualities of an active BS (Base Station) and neighbor BSs measured by an MSS (Mobile Subscriber Station) to the active BS when the MSS is located in an area covered by the active BS and the neighbor BSs in a communication system including the MSS (Mobile Subscriber Station), the active BS for providing the MSS with a desired service, and the plurality of BSs adjacent to the active BS, comprising the steps of: a) controlling the active BS to transmit channel quality measurement information needed for the MSS to measure channel qualities of the active BS and the neighbor BSs and also other channel quality report information needed to report the channel qualities of the measured active BS and the neighbor BSs to the MSS; b) controlling the MSS to measure a channel quality according to the channel quality measurement information in association with the active BS and the neighbor BSs associated with neighbor BS-associated information; and c) controlling the MSS to transmit the channel qualities of the measured active BS and neighbor BSs to the active BS according to the channel quality report information.

In accordance with yet another aspect of the present invention, there is provided a method for reporting channel qualities of active BS (Base Station) and neighbor BSs measured by an MSS (Mobile Subscriber Station) to the active BS when the MSS is located in an area covered by the active BS and the neighbor BSs in a communication system including the MSS (Mobile Subscriber Station), the active BS for providing the MSS with a desired service, and the plurality of BSs adjacent to the active BS, comprising the steps of: a) controlling the active BS to transmit channel quality measurement information needed for the MSS to measure channel qualities of the active BS and neighbor BSs, and also other channel quality report information needed to report the channel qualities of the measured active BS and the measured neighbor BSs to the MSS; b) controlling the MSS to measure a channel quality according to the channel quality measurement information in association with the active BS and the neighbor BSs associated with neighbor BS-associated information; c) controlling the MSS to transmit the channel qualities of the measured active BS and the measured neighbor BSs to the active BS; d) controlling the MSS to measure channel qualities of the active BS and the neighbor BSs according to the channel quality measurement information; and e) controlling the MSS to transmit individual channel qualities of the measured active NS and neighbor BSs in response to the channel quality report information to the active BS.

In accordance with yet another aspect of the present invention, there is provided a method for reporting channel qualities of active BS (Base Station) and neighbor BSs measured by an MSS (Mobile Subscriber Station) to the active BS when the MSS is located in an area covered by the active BS and the neighbor BSs in a communication system including the MSS (Mobile Subscriber Station), the active BS for providing the MSS with a desired service, and the plurality of BSs adjacent to the active BS, comprising the steps of: a) receiving channel quality report information identifying channel periods of the channel qualities from the active BS, and receiving channel quality measurement information associated with individual channel qualities of the neighbor BSs and the active BS from the active BS; b) measuring SINRs (Signal to Interference and Noise Ratios) of the neighbor BSs and the active BS according to the channel quality measurement information; and c) reporting the measured SINRs of the neighbor BSs and the active BS to the active BS according to the channel quality report period.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
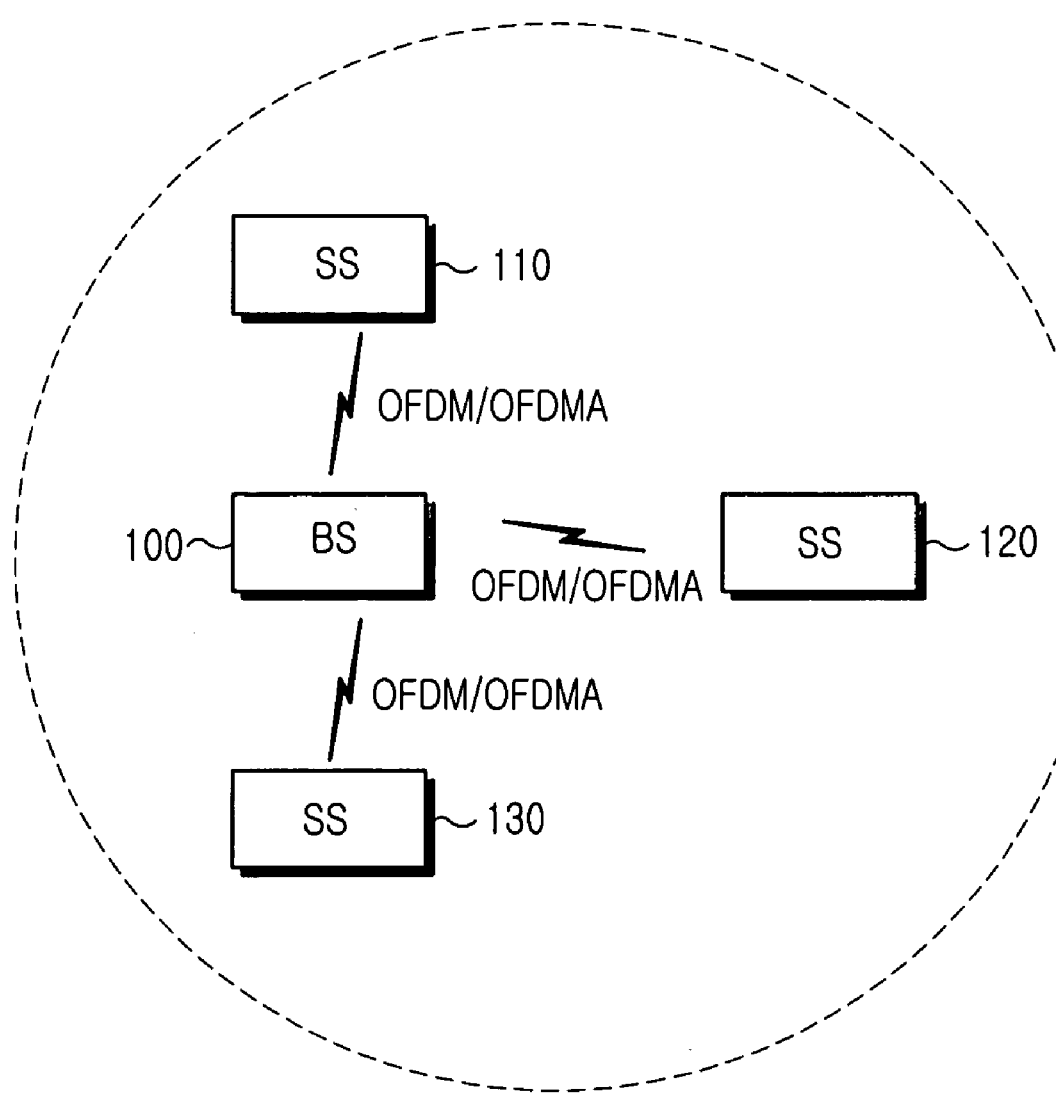
FIG. 1 is a block diagram illustrating a broadband wireless access communication system using an OFDM/OFDMA scheme.
Figure 2:
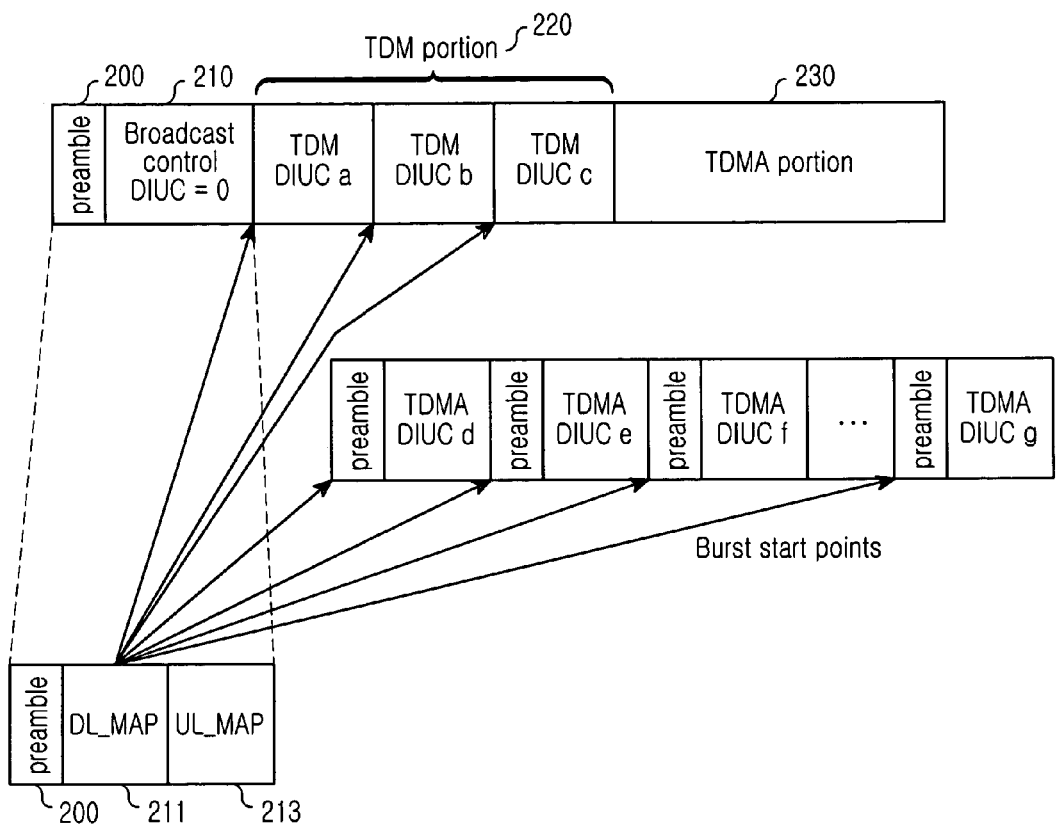
FIG. 2 is a conceptual diagram illustrating a downlink frame structure for use in a broadband wireless access communication system using an OFDM/OFDMA scheme.
Figure 3:
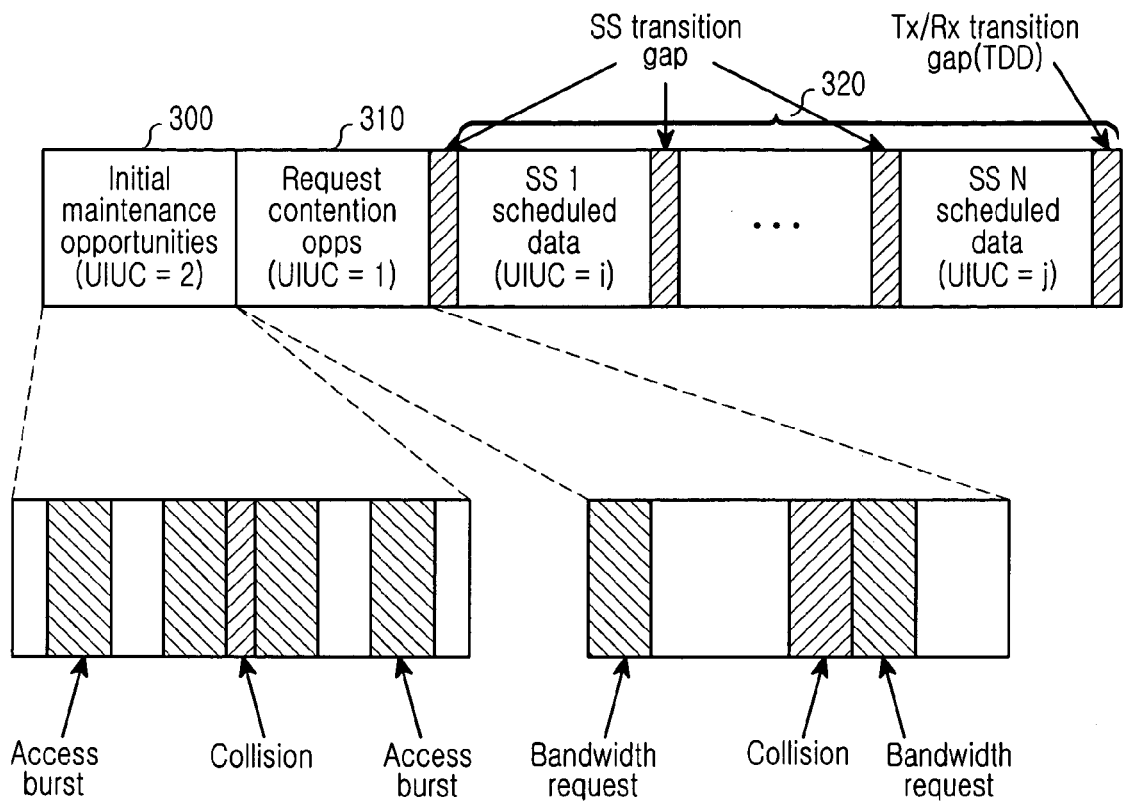
FIG. 3 is a conceptual diagram illustrating an uplink frame structure for use in a broadband wireless access communication system using an OFDM/OFDMA scheme.
Figure 4:
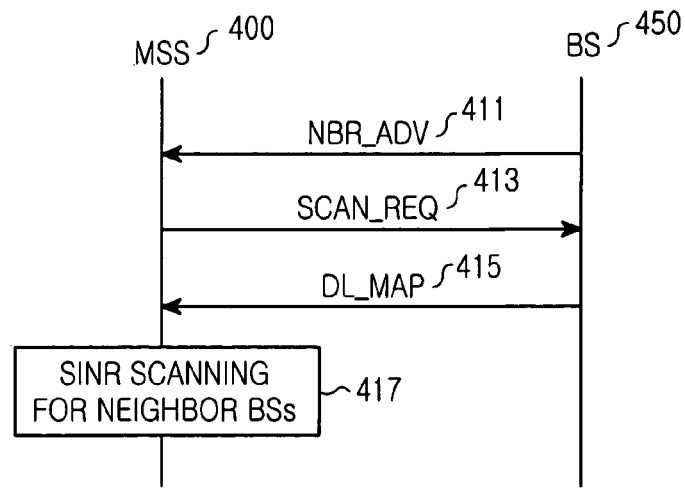
FIG. 4 is a flow chart illustrating a method for measuring SINRs of pilot signals transferred from active BS and neighbor BSs in a broadband wireless access communication system using an OFDM/OFDMA scheme.
Figure 5:
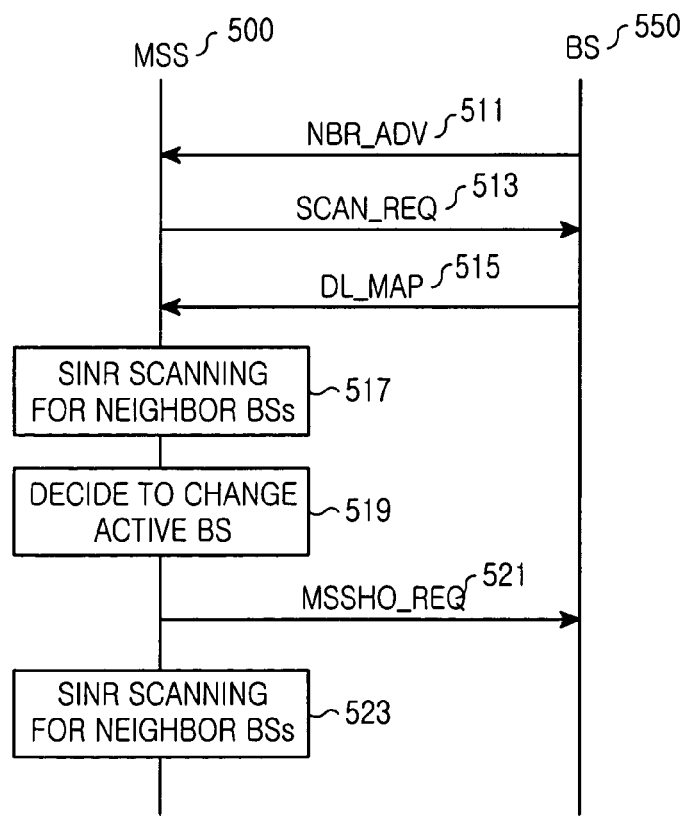
FIG. 5 is a flow chart illustrating a handover request process of an MSS in a broadband wireless access communication system using an OFDM/OFDMA scheme.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to describing the present invention, the handover procedure proposed by the current IEEE 802.16e system includes only two procedures, i.e., a scanning procedure and an SINR scanning result report procedure. More specifically, the scanning procedure is used to measure an SINR of a pilot signal upon receipt of an MSS request, and the SINR scanning result report procedure is used to report the SINR scanning result of a pilot signal upon receiving a handover request from an MSS. In this case, the expression "Pilot signal's SINR measurement" is considered to be the same as the other expression "Pilot signal's SINR scan or scanning" for the convenience of description. It should be noted that the term "Scan" is substantially equal to the term "Scanning". However, in order to provide the MSS with an effective handover operation, the MSS must conduct pilot SINR scanning operations of neighbor BSs before generating a handover request. Where an active BS for providing the MSS with a desired service is changed to another BS due to movement of the MSS, the MSS must continuously conduct pilot SINR scanning operations of the active BS and the neighbor BSs, and must inform the active BS of the scanning pilot SINR results, such that a handover function for the changed active BS is performed. In order to implement an effective handover operation of the MSS, the present invention provides a method for performing a pilot SINR scanning operation upon receiving a control signal from a BS without using a request signal of the MSS, and a method for controlling the MSS to report the scanned pilot SINR results.

Figure 6:
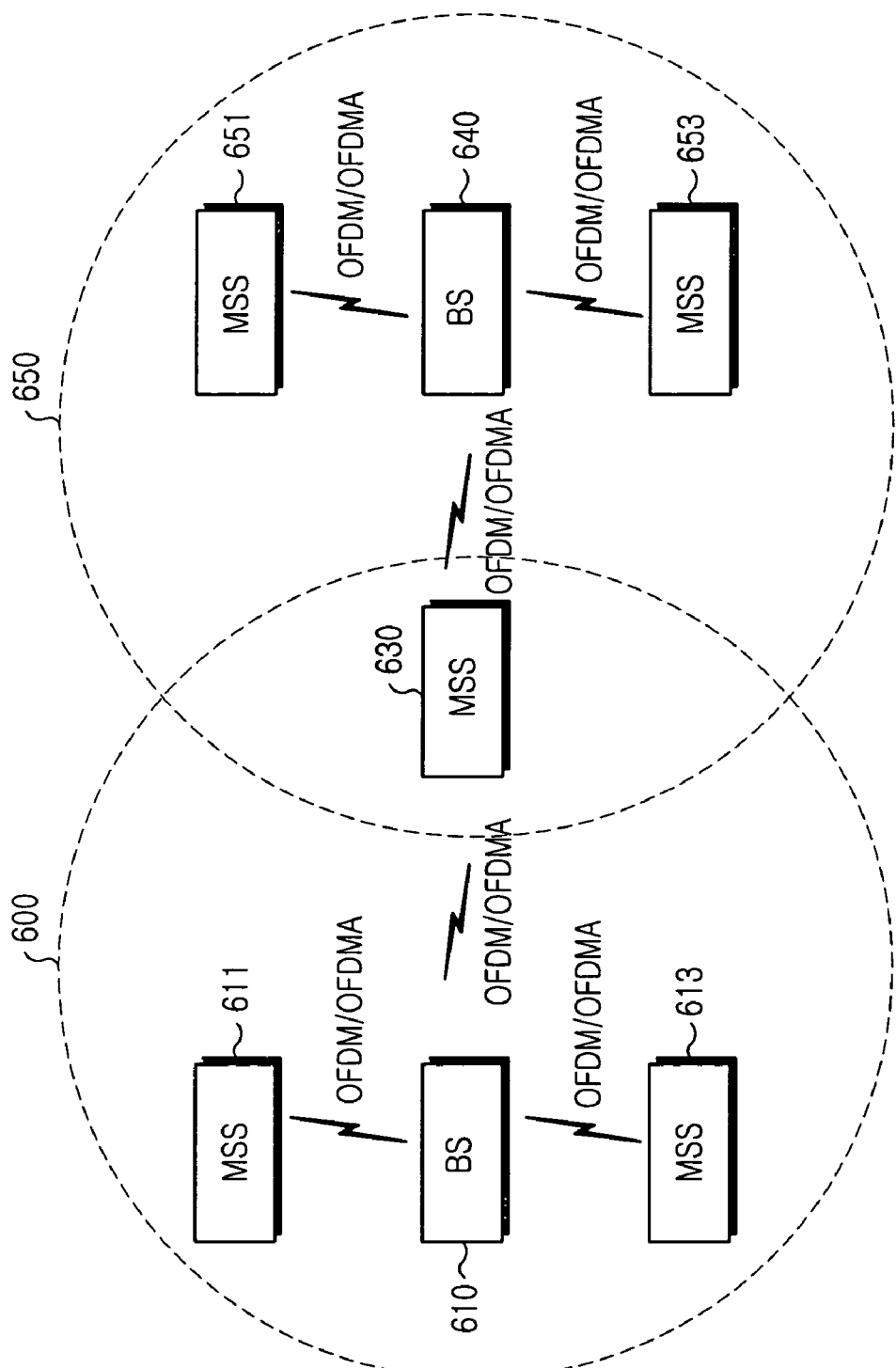
FIG. 6 is a block diagram illustrating a broadband wireless access communication system using an OFDM/OFDMA scheme in accordance with the present invention.

FIG. 6 is a block diagram illustrating a broadband wireless access communication system using an OFDM/OFDMA scheme in accordance with the present invention. However, prior to describing the BWA communication system illustrated in FIG. 6, it should be noted that the IEEE 802.16e communication system acting as a communication system for considering the SS's mobility in the EEE 802.16a communication system has not been developed yet. Provided that the SS's mobility is considered in the IEEE 802.16a communication system, it is possible to consider the multi-cell structure and an SS's handover operation between the multi-cells. Therefore, the present invention provides the IEEE 802.16e communication system as illustrated in FIG. 6. The present invention utilizes the IEEE 802.16e communication system as a BWA (Broadband Wireless Access) communication system using an OFDM/OFDMA scheme as a representative example. Accordingly, it should be noted that an SC (Single Carrier) scheme is applicable to the IEEE 802.16e communication system. In this case, the pilot signal's SINR indicates a channel quality of a specific channel established between the MSS and the BS.

Referring to FIG. 6, the IEEE 802.16e communication system includes a multi-cell structure, i.e., a plurality of cells 600 and 650. More specifically, the IEEE 802.16e communication system includes a first BS 610 for managing the cell 600, a second BS 640 for managing the cell 650, and a plurality of MSSs 611, 613, 630, 651, and 653. Signal transmission and reception among the BSs 610 and 640 and the MSSs 611, 613, 630, 651, and 653 is established using the OFDM/OFDMA scheme. The MSS 630 from among the MSSs 611, 613, 630, 651, and 653 is positioned in a boundary (i.e., a handover area) between the first cell 600 and the second cell 650. The IEEE 802.16e communication system can provide the MSS's mobility on the condition that the handover operation for the MSS 630 must be supported.

Figure 7:
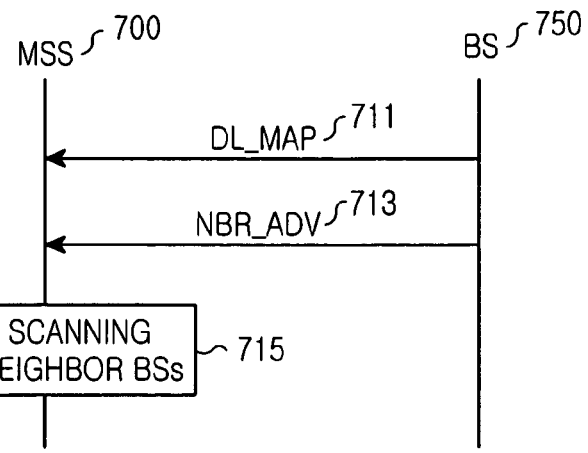
FIG. 7 is a flow chart illustrating a pilot SINR scanning procedure in accordance with a first preferred embodiment of the present invention.

FIG. 7 is a flow chart illustrating a pilot SINR scanning procedure in accordance with a first preferred embodiment of the present invention. Referring to FIG. 7, the BS 750 transmits a DL(DownLink)_MAP message to the MSS 700 at step 711. In this case, the DL_MAP message includes a SCANNING_IE (Information Element) message identifying scan information of the MSS 700 in a conventional DL_MAP message of the IEEE 802.16e system described in the prior art. More specifically, if the powered-on MSS 700 is initialized to control the MSS 700 to perform the SINR scanning operation, the BS 750 includes the SCANNING_IE message in the DL_MAP message, and transmits the SCANNING_IE message including the DL_MAP message to the MSS 700 without receiving a scan request signal from the MSS 700. In this case, the SCANNING_IE message may be equal to the SCANNING_IE messages shown in Tables 6 to 8 of the prior art, or may also be equal to a new SCANNING_IE message of the present invention. The SCANNING_IE message acts as channel quality measurement information for measuring the pilot SINR (i.e., a channel quality). The new SCANNING_IE messages of the present invention are shown in Tables 10 to 12 below.

TABLE 10

| For SCa PHY: | | |
|---|---|---|
| Syntax | Size | Notes |
| Scanning_IE { | | |
| CID | 16 bits | MSS basic CID |
| Scan Start | 22 bits | Offset (in units of mini-slots) to the start of the scanning interval from the mini-slot boundary specified by the downlink Allocation_Start_Time |
| Scan Duration | 22 bits | Duration (in units of mini-slots) where the MSS may scan for neighbor BS |
| Scan Period | 22 bits | Period (in units of mini-slots) when the MSS may scan for neighbor BS |
| } | | |

Referring to Table 10, the SCANNING_IE message includes scan information for use in the SC physical channel. Parameters contained in the SCANNIG_IE message are a CID (Connection ID), a Scan Start value, a Scan Duration value, and a Scan Period value. The CID identifies an MSS basic CID for use with the SCANNING_IE message. The Scan Start value is a predetermined time at which the MSS begins a pilot SINR scanning operation. The Scan Duration is a predetermined interval during which the MSS performs the pilot SINR scanning operation. The scan period is a predetermined period during which the MSS performs the pilot SINR scan operation. The scan start value, the scan duration value, and the scan period value for use in the SC physical channel are configured in the form of mini-slot units.

TABLE 11

For OFDM PHY:

| Syntax | Size | Notes |
|---|---|---|
| Scanning_IE { | | |
| CID | 16 bits | MSS basic CID |
| Scan Start | 18 bits | Indicate the scanning interval start time, in units of OFDM symbol duration, relative to the start of the first symbol of the PHY PDU (including preamble) where the DL_MAP message is transmitted |
| Scan Duration | 18 bits | Duration (in units of OFDM symbols) where the MSS may scan for neighbor BS |
| Scan Period | 18 bits | Period (in units of OFDM symbols) when the MSS may scan for neighbor BS |
| } | | |

Referring to Table 11, the SCANNING_E message includes scan information for use in the OFDM physical channel. Parameters contained in the SCANNIG_IE message are a CID (Connection ID), a Scan Start value, a Scan Duration value, and a Scan Period value. The CID identifies an MSS basic CID for use with the SCANNING_IE message. The Scan Start value is a predetermined time at which the MSS begins a pilot SINR scanning operation. The scan duration is a predetermined interval during which the MSS performs the pilot SINR scanning operation. The scan period is a predetermined period during which the MSS performs the pilot SINR scan operation. The scan start value, the scan duration value, and the scan period value for use in the OFDM physical channel are configured in the form of OFDM-symbol units.

TABLE 12

For OFDMA PHY:

| Syntax | Size | Notes |
|---|---|---|
| Scanning_IE { | | |
| CID | 16 bits | MSS basic CID |
| Scan Start | 18 bits | The offset of the OFDM symbol in which the scanning interval starts. Measured in OFDM symbols from the time specified by the Allocation_Start_time_Field in the DL_MAP |
| Scan Duration | 18 bits | Duration (in units of OFDM symbols) where the MSS may scan for neighbor BS |
| Scan Period | 18 bits | Period (in units of OFDM symbols) when the MSS may scan for neighbor BS |
| } | | |

Referring to Table 12, the SCANNING_IE message includes scan information for use in the OFDMA physical channel. Parameters contained in the SCANNIG_IE message are a CID (Connection ID), a Scan Start value, and a scan duration value. The CID identifies an MSS basic CID for use with the SCANNING_IE message. The Scan Start value is a predetermined time at which the MSS begins a pilot SINR scanning operation. The scan duration is a predetermined interval during which the MSS performs the pilot SINR scanning operation. The scan period is a predetermined period during which the MSS performs the pilot SINR scan operation. The scan start value, the scan duration value, and the scan period value for use in the OFDM physical channel are configured in the form of OFDM-symbol units.

The BS 750 transmits an NBR_ADV (Neighbor BSs Advertisement) message to the MSS 700. As previously stated in Table 4, the NBR_ADV message includes a Management Message Type field including transmission message type information; an N_Neighbors field including the number of neighbor BSs; a neighbor BS-ID field including ID information of the neighbor BSs; a Configuration Change Count field including the number of configuration changes; a physical frequency field including physical channel frequencies of the neighbor BSs; and a TLV Encoded Neighbor Information field including information associated with the neighbor BSs, other than the above neighbor-BSs-associated information.

The MSS 700, having received the NBR_ADV message including the information associated with the neighbor BSs from the BS 750, scans neighbor BSs recognized by the NBR_ADV message (i.e., SINRs of pilot signals transferred from the neighbor BSs) according to parameters contained in the SCANNING_IE message contained in the DL_MAP message at step 715. It should be noted that SINRs of pilot signals transferred from the neighbor BSs and the SINR of the pilot signal transferred from the BS 750 to which the MSS 700 currently belongs are continuously scanned, even though it is not illustrated in FIG. 7.

As a result, in accordance with the MSS scanning procedure illustrated in FIG. 7, the BS transmits scan information associated with the scanning operation to the MSS even though the MSS does not transmit an additional request to the BS, such that the MSS can effectively perform a scan operation.

Figure 8:
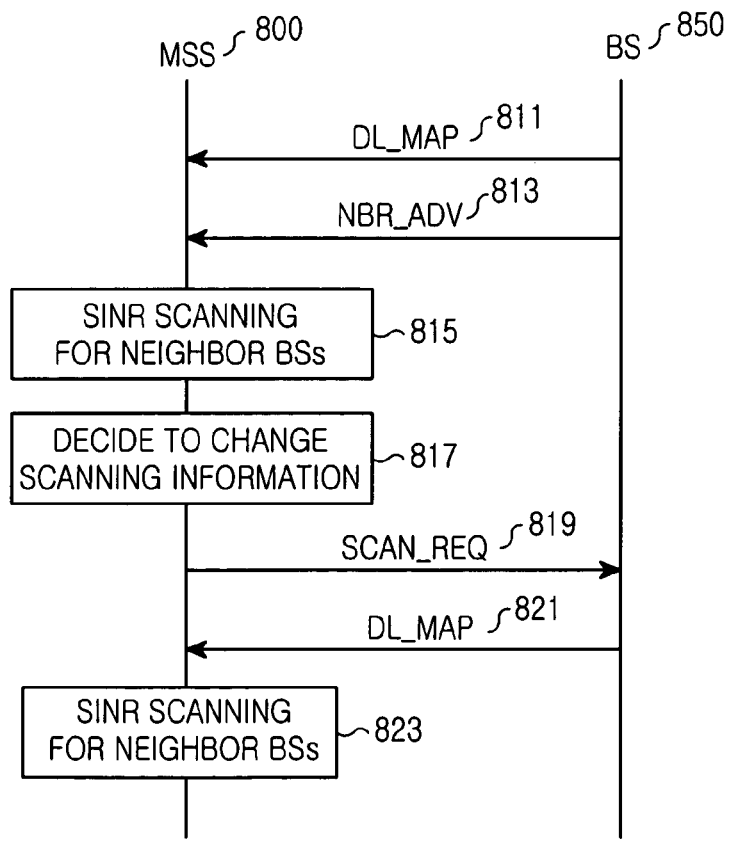
FIG. 8 is a flow chart illustrating a pilot SINR scanning procedure in accordance with a second preferred embodiment of the present invention.

FIG. 8 is a flow chart illustrating a pilot SJNR scanning procedure in accordance with a second preferred embodiment of the present invention. However, prior to describing FIG. 8, the SJNR scanning process of the first preferred embodiment illustrated in FIG. 7 is a pilot SINR scanning process of the MSS in response to the scan information of the BS. The SINR scanning process of the second preferred embodiment changes scan information such as scan duration and scan period information to other information upon receiving a request from the MSS while the MSS scans the pilot SINR in response to scan information transferred from the BS, such that the pilot SINR can be scanned.

Referring to FIG. 8, the BS 850 transmits a DL_MAP message to the MSS 800 at step 811. The DL_MAP message includes the SCANNING_IE message including the MSS 800's scan information in the conventional DL_MAP message of the IEEE 802.16e communication system previously stated in the prior art. In this case, the SCANNING_IE message may be the same as the SCANNING_IE messages shown in Tables 6 to 8 of the prior art, or may also be equal to a new SCANNING_IE message of the present invention, i.e., the same SCANNING_IE message described in Tables 10 to 12.

After transmitting the DL_MAP message, the BS 850 transmits the NBR_ADV message to the MSS 800 at step 813. As previously stated in Table 4, the NBR_ADV message includes a Management Message Type field including transmission message type information (i.e., a plurality of IEs); an N_Neighbors field including the number of neighbor BSs; a neighbor BS-ID field including ID information of the neighbor BSs; a Configuration Change Count field including the number of configuration changes; a physical frequency field including physical channel frequencies of the neighbor BSs; and a TLV Encoded Neighbor Information field including information associated with the neighbor BSs other than the above neighbor-BSs-associated information.

The MSS 800, having received the NBR_ADV message including the information associated with the neighbor BSs from the BS 850, scans neighbor BSs recognized by the NBR_ADV message (i.e., SINRs of pilot signals transferred from the neighbor BSs) according to parameters contained in the SCANNING_IE message contained in the DL_MAP message at step 815. It should be noted that SINRs of pilot signals transferred from the neighbor BSs and the SINR of the pilot signal transferred from the BS 850 to which the MSS 800 currently belongs are continuously scanned, even though it is not illustrated in FIG. 8.

As a result, the MSS decides to change scan-associated information (i.e., scan information such as scan duration and scan period information) while scanning SINRs of the pilot signals transferred from the neighbor BSs at step 817. In this case, there may be a plurality of conditions for controlling the MSS 80 to change scan-associated information. For example, where the measurement period must be adjusted according to physical channel capacity, scanning information conversion may be requested. More specifically, if there is too much load in the physical channel, the MSS 800 may determine a measurement period to be a long measurement period. If there is relatively little load in the physical channel, the MSS 800 may determine a measurement period to be a relatively short measurement period.

The MSS 800, having decided to change scanning information to other information, transmits a SCAN_REQ message to the BS 850 at step 819. In this case, the SCAN_REQ message includes a Management Message Type field including transmission message type information (i.e., a plurality of IEs) and a Scan Duration field indicative of a desired scan duration during which the SINRs of the pilot signals transferred from the neighbor BSs will be scanned. If the IEEE 802.16e communication system is based on an SC scheme, i.e., if the scan duration field is adapted to an SC physical channel, the scan duration field is configured in the form of mini-slot units. If the IEEE 802.16e communication system is an OFDM/OFDMA system, i.e., if the IEEE 802.16e communication system is applied to an OFDM/OFDMA physical channel, the scan duration field is configured in the form of OFDM symbols.

The BS 850, having received the SCAN_REQ message, transmits the DL_MAP message including information to be scanned by the MSS 800 to the MSS 800 at step 821. The MSS 800 receives the DL_MAP message including the SCANNING_IE message and performs a pilot SINR scanning process associated with the neighbor BSs in response to parameters contained in the SCANNING_IE message at step 823.

Figure 9:
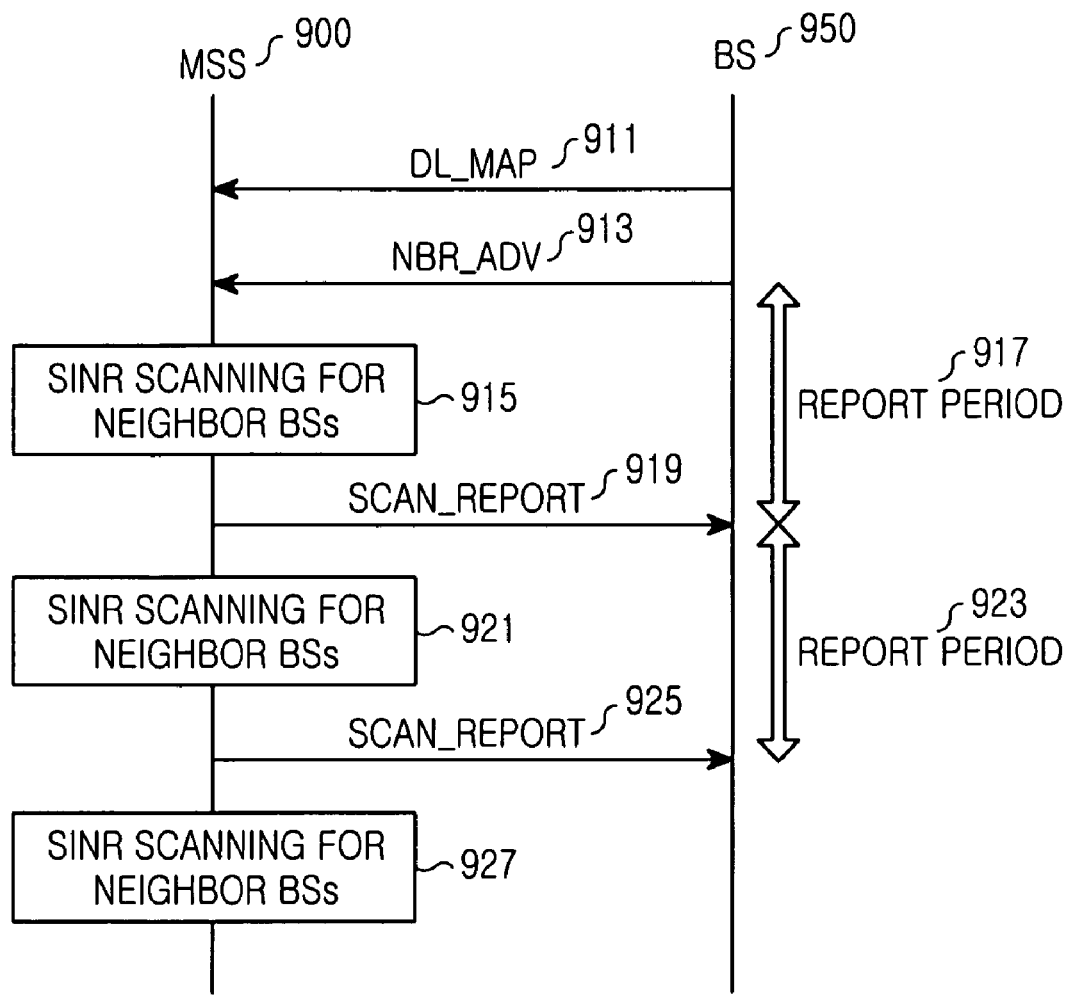
FIG. 9 is a flow chart illustrating a pilot SINR scan report procedure in accordance with a third preferred embodiment of the present invention.

FIG. 9 is a flow chart illustrating a pilot SINR scan report procedure in accordance with the third preferred embodiment of the present invention. However, prior to describing FIG. 9, it should be noted that a current IEEE 802.16e communication system has not proposed additional procedures for controlling the MSS to report pilot SINR scan result information. Because there is no process for reporting such pilot SINR scan result information in the IEEE 802.16e communication system, the BS may command the MSS to be handed over to another BS even though it does not recognize SINR scan result data associated with neighbor BSs of the MSS, resulting in deterioration of communication efficiency. For example, it is assumed that the neighbor BSs of the MSS are composed of first to sixth BSs and an SINR value of a pilot signal received from the second BS is a maximum value. In this case, the MSS may have the best channel condition when it is handed over to the second BS from among six neighbor BSs, but an active BS to which the MSS currently belongs does not recognize the SINR scan result data of the neighbor BSs. The MSS may also be handed over to another BS (e.g., the sixth BS) different from the second BS. The BS can transmit a handover request signal to the MSS in the following two cases.

The first case indicates a specific case where the current BS's capacity reaches a threshold value. The second case indicates a specific case where an MSS having a priority higher than that of the current service MSS enters the BS.

Due to the aforementioned reasons, it is very important for the MSS to report pilot SINR scanning result data. The present invention proposes two pilot SINR scanning result report methods, i.e., a periodic scan report method and an event triggering scan report method. The periodic scan report method and the event trigger scan report method will hereinafter be described in more detail.

(1) Periodic Scan Report Method

In accordance with the periodic scan report method, the MSS reports SINRs of pilot signals of the scanned active BS and neighbor BSs to the active BS according to a predetermined period.

(2) Event Triggering Scan Report Method

In accordance with the event triggering scan report method, the MSS reports SINRs of pilot signals of the scanned active BS and neighbor BSs to the active BS only when prescribed setup events have been generated. The event triggering scan report method controls the MSS to report SINRs of pilot signals of the scanned active BS and neighbor BSs to the active BS only when either one of events "a" and "b" has been generated. The event "a" and the other event "b" are shown in Table 13 below.

TABLE 13

| Event | Condition | Operation |
|---|---|---|
| Event a | When active BS is unchanged but the order of neighbor BSs' SINRs is changed | When event "a" occurs after transmitting initial measurement, pilot SINR measurement of neighbor BS is transmitted to serving BS via Scan_Report message |
| Event b | When neighbor BS's pilot SINR is higher than serving BS's SINR | When event "b" occurs, MSS transmits MSSHO_REQ message with neighbor BS's pilot SINR value to request handover function to serving BS |

Referring to Table 13, the event "a" indicates a specific case when a pilot SINR of an active BS is not less than pilot SINRs of neighbor BSs, but the magnitudes of the pilot SINRs of neighbor BSs are changed, such that the order of the magnitudes is changed to another order. More specifically, the event "a" indicates a specific case when the magnitudes of pilot SINRs of neighbor BSs are changed to others on the condition that the active BS of the MSS is unchanged. The scan report operations in case of generating the event "a" will hereinafter be described. Before generating the event "a", the MSS reports initially-scanned pilot SINRs of the active BS and neighbor BSs to the active BS. When generating the event "a" while scanning the pilot SINRs, the scanned pilot SINRs of the active BS and neighbor BSs are reported to the active BS. The scan report operation for the event "a" enables the active BS to continuously recognize the pilot SINRs of the neighbor BSs in the same manner as in the periodic scan report method. Further, the scan report operation for the event "a" reduces the number of scan report operations of the MSS as compared to the periodic scan report operation when the MSS moves to another position at a relatively low speed, such that it minimizes the amount of resource use in response to the scan report operation, resulting in increased overall efficiency of system resources. In this case, the scan report operation is carried out using a SCAN_REPORT message, which will be described later in more detail, such that its detailed description will herein be omitted.

Referring to Table 13, the event "b" indicates a specific case where there arises a neighbor BS with a pilot SINR magnitude higher than a pilot SINR magnitude of an active BS to which the MSS currently belongs. More specifically, the event "b" indicates a specific case where the active BS of the MSS is changed to another BS.

Before generating the event "b", the MSS reports initially-scanned pilot SINRs of the active BS and neighbor BSs to the active BS. Thereafter, in the case of generating the event "b", the MSS transmits an MSSHO_REQ (Mobile Subscriber Station HandOver Request) message containing scanning result data of the active BS and neighbor BSs to the active BS, such that it can request such a handover function from the active BS. As previously shown in Table 9 of the prior art, the MSSHO_REQ message includes a Management Message Type field including transmission message type information (i.e., a plurality of IEs), an Estimated_Ho_Time field including a handover start time, and an N_Recommended field including MSS scanning result data. In this case, the N_Recommended field includes IDs of the neighbor BSs and SINRs of pilot signals of the neighbor BSs. Therefore, the scan report operation for the event "b" performs a scan report operation only when the MSS generates its request signal, such that it reduces the number of scan report operations of the MSS as compared to the periodic scan report operation, such that it minimizes the amount of resource use in response to the scan report operation, resulting in an increased overall efficiency of system resources.

It is assumed that the scan report method could be applied in FIG. 9. Referring to FIG. 9, the BS 950 transmits a DL_MAP message to the MSS 900 at step 911. In this case, the DL_MAP message includes a SCAN_REPORT_IE message for implementing a scan report operation. In this case, the SCAN_REPORT_IE message acts as channel quality report information for reporting a channel quality. The SCAN_REPORT_IE message is shown in Table 14 below.

TABLE 14

| Syntax | Size | Notes |
| --- | --- | --- |
| Scan_Report_IE { | | |
| CID | 16 bits | MSS basic CID |
| PERIODIC_N_REPORTMODE | 8 bits | Periodic Report Mode number |
| For(i=0;j<PERIODIC_N_REPORTMODE;j++){ | | |
| Report Period | 8 bits | Only if report Mode number |
| } | | |
| Event A mode | 1 bit | 0: Event A not used 1: Event A used |
| Event B mode | 1 bit | 0: Event B not used 1: Event B used |
| If (Event B mode == 1) | | |
| Timer 1 | 8 bits | Only if report mode is event b. Timer 1 is the shortest time to maintain the situation that pilot SINR of certain neighbor BS is higher than pilot SINR of serving BS |
| } | | |
| } | | |

Referring to Table 14, the SCAN_REPORT_IE message includes an N_REPORTMODE parameter. The N_REPORTMODE parameter indicates that there are N report modes for the scan report function.

The present invention will hereinafter disclose three modes, i.e., a periodic report mode in response to a periodic scan report operation, an Event "a" mode in response to a scan report operation for occurrence of the Event "a", and an Event "b" mode in response to a scan report operation for occurrence of the Event "b". The present invention may carry out a scan report operation using either the event "a" mode or the event "b" mode along with the periodic report mode, such that the MSS can periodically report pilot SINRs of the active BS and neighbor BSs and can also perform an optimum scan report operation according to the MSS moving situation.

The SCAN_REPORT_IE message shown in Table 14 includes a PERIODIC_N_REPORTMODE parameter. The PERIODIC_N_REPORTMODE parameter indicates the number of periodic scan report operations of the MSS. In this case, the scan report period may be variably determined, such that a Report Period value acting as the scan report period is marked on the PERIODIC_N_REPORTMODE parameter. An event is applied to the scan report operation on a one by one basis, the SCAN_REPORT_IE message includes Event A mode- and Event B mode-parameters indicating which one of the events is associated with a corresponding event triggering scan report operation.

The scan report operation for the Event "b" occurs in the case where pilot SINRs of neighbor BSs are higher than a pilot SINR of the active BS. In this case, it is desirable that the MSSHO_REQ message be transmitted to the active BS only when the pilot SINRs of the neighbor BSs are continuously higher than the pilot SINR of the active BS during a predetermined time, because there may arise a ping-pong phenomenon when the active BS's pilot SINR and the pilot SINRs of the neighbor BSs are continuously changed to others. In this case, a timer for waiting for a predetermined time to prevent the ping-pong phenomenon is called a first timer (i.e., timer 1). The timer 1 is associated with only a specific case in which the scan report operation occurs in response to the event "b". The DL_MAP message includes the SCANNING_IE message for scanning the MSS 900, and the SCANNING_IE message is shown above in Tables 10 to 12.

Referring to FIG. 9, after transmitting a DL_MAP message including the SCAN_REPORT IE and SCANNING_IE messages at step 911, the BS 950 transmits an NBR_ADV message to the MSS 900 at step 913. As previously shown in Table 4, the NBR_ADV message includes a Management Message Type field including transmission message type information (i.e., a plurality of IEs); an N_Neighbors field including the number of neighbor BSs; a neighbor BS-ID field including ID information of the neighbor BSs; a Configuration Change Count field including the number of configuration changes; a physical frequency field including physical channel frequencies of the neighbor BSs; and a TLV Encoded Neighbor Information field including information associated with the neighbor BSs, other than the above neighbor-BSs-associated information.

The MSS 900 receives the NBR_ADV message including the information associated with the neighbor BSs from the BS 950 and scans neighbor BSs recognized by the NBR_ADV message (i.e., SINRs of pilot signals transferred from the neighbor BSs) according to parameters contained in the SCANNING_IE message contained in the DL_MAP message at step 915. It should be noted that SINRs of pilot signals transferred from the neighbor BSs and the SINR of the pilot signal transferred from the BS 950 to which the MSS 900 currently belongs are continuously scanned, even though it is not illustrated in FIG. 9.

Accordingly, if a current time reaches a time period corresponding to the Report Period message of the SCAN_REPORT_IE message contained in the DL_MAP message at step 917, the MSS transmits the SCAN_REPORT message having pilot SINRs of the scanned neighbor BSs to the BS 950 at step 919. The SCAN_REPORT message is shown in Table 15 below.

TABLE 15

| Syntax | Size | Notes |
|---|---|---|
| SCAN_REPORT_Message_Format ( ) { | | |
|   Management Message Type = ? | 8 bits | |
|   Report Mode | 2 bits | 00: Periodic |
| | | 01: event a |
| | | 10: event b |
|   N_NEIGHBORS | 8 bits | |
|   For(i=0;j<N_NEIGHBORS;j++){ | | |
|     Neighbor BS-ID | 48 bits | |
|     S(I+N) | 16 bits | |
|   } | | |
| } | | |

Referring to Table 15, the SCAN_REPORT message includes a Management Message Type field indicating transmission message type information (i.e., a plurality of IEs), a Report Mode field including a report mode, an N_Neighbors field including the MSS scanning result. Neighbor BS-IDs of neighbor BSs and pilot SINRs of individual neighbor BSs are marked in the N_Neighbors field. In this case, the Report Mode indicates which mode is adapted to transmit the SCAN_REPORT message.

As described above, where the MSS performs the scan report operation simultaneously with transmitting a handover request, IEs contained in the SCAN_REPORT message are contained in the MSSHO_REQ message without any change. The associated operations of the MSS will be described later in more detail.

The MSS 900 transmits the SCAN_REPORT message to the BS 950, and scans pilot SINRs of neighbor BSs in response to parameters contained in the SCANNING_IE message at step 921. If a current time reaches a time period corresponding to the Report Period message of the SCAN_REPORT_IE message during the scanning times of the SINRs of the pilot signals transmitted from the neighbor BSs at step 923, the MSS transmits the SCAN_REPORT message including pilot SINRs of the scanned neighbor BSs to the BS 950 at step 925. The MSS 900 transmits the SCAN_REPORT message to the BS 950, and re-scans pilot SINRs of neighbor BSs in response to parameters contained in the SCANNING_IE message at step 927. Therefore, the MSS 900 can periodically report pilot SINRs of the active BS and neighbor BSs to the BS 950.

Figure 10:
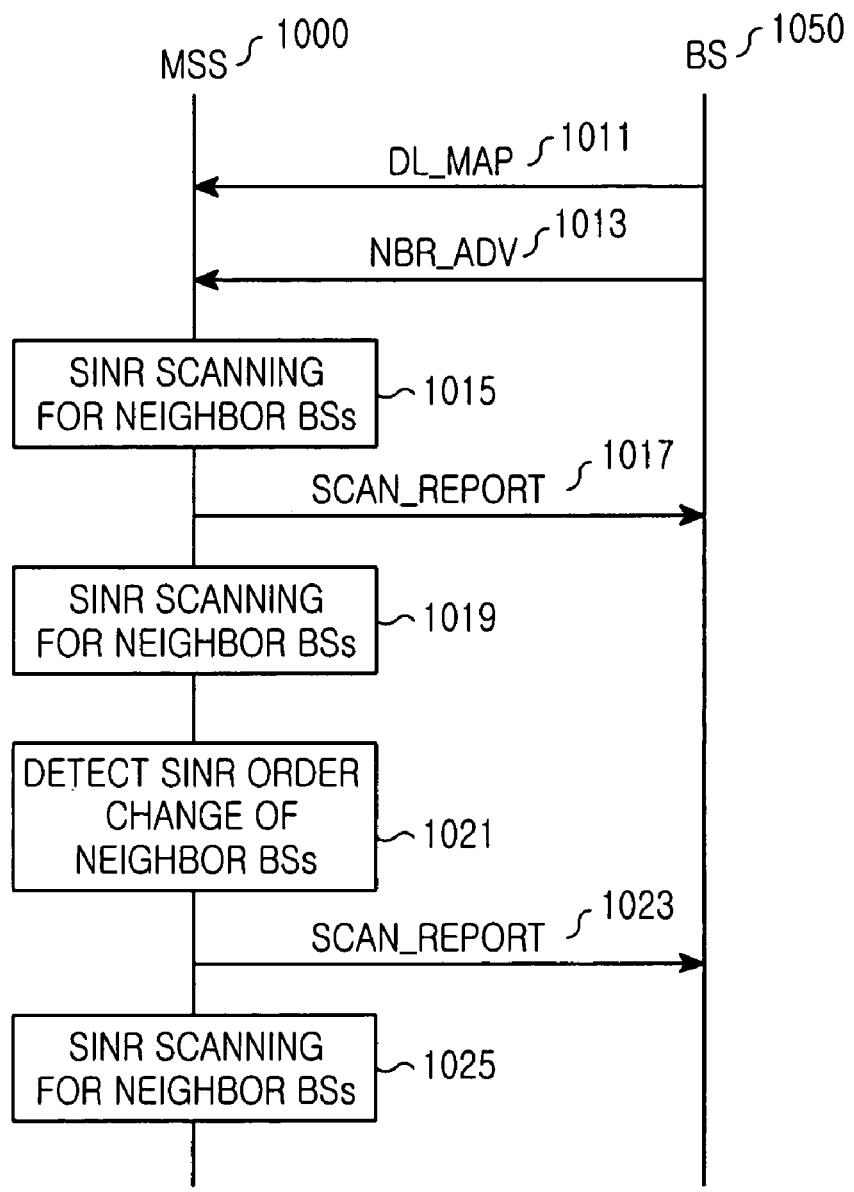
FIG. 10 is a flow chart illustrating a pilot SINR scan report procedure in accordance with a fourth preferred embodiment of the present invention.

FIG. 10 is a flow chart illustrating a pilot SINR scan report procedure in accordance with a fourth preferred embodiment of the present invention. It is assumed that the scan report method utilizes the scan report method based on the event "a" occurrence in FIG. 10.

Referring to FIG. 10, the BS 1050 transmits a DL_MAP message including the SCAN_REPORT_IE message to the MSS 1000 at step 1011. The SCAN_REPORT_IE message includes the same parameters as in Table 14. The scan report method is based on the occurrence of the event "a", such that the Event "a" mode value is determined to be a value of 1. The DL_MAP message also includes the SCANNING_IE message for the MSS 1000's scanning operation, and the SCANNING_IE message is shown in Tables 10 to 12.

The BS 1050 transmits the DL_MAP message including the SCAN_REPORT_IE and SCANNING_IE messages to the MSS 1000, and transmits the NBR_ADV message to the MSS 1000 at step 1013. The NBR_ADV message is the same as in Table 4 of the prior art, such that its detailed description will herein be omitted.

The MSS 1000, having received the NBR_ADV message including the information associated with the neighbor BSs from the BS 1050, scans neighbor BSs recognized by the NBR_ADV message (i.e., SINRs of pilot signals transferred from the neighbor BSs) according to parameters contained in the SCANNING_IE message contained in the DL_MAP message at step 1015. It should be noted that SINRs of pilot signals transferred from the neighbor BSs and the SINR of the pilot signal transferred from the BS 1050 to which the MSS 1000 currently belongs are continuously scanned, even though it is not illustrated in FIG. 10.

After scanning SINRs of pilot signals transferred from the active BS (i.e., the BS 1050) and neighbor BSs, the MSS transmits the SCAN_REPORT message including the SINRs of the scanned BS 1050 and neighbor BSs to the BS 1050 at step 1017. The scan report operation for the event "a" allows the MSS 1000 to firstly report pilot SINRs of the BS 1050 and neighbor BSs to the BS 1050, and then re-performs the scan report operation only when the order of magnitudes of the pilot SINRs of the initially-reported BS 1050 and neighbor BSs is changed to another order, such that the MSS 1000 initially performs the scan report operation only once.

Accordingly, the MSS 1000 transmits the SCAN_REPORT message to the BS 1050, and scans pilot SIRs of the BS 1050 and neighbor BSs according to parameters contained in the SCANNING_IE message at step 1019. If the event "a" occurs during the scanning time of the SINRs of the pilot signals transferred from the BS 1050 and neighbor BSs, i.e., if there arises a variation in the magnitude order of pilot SINRs of the neighbor BSs even though the magnitudes of the pilot SINRs of the BS 1050 are higher than the pilot SINRs of the neighbor BSs at step 1021, the MSS 1000 transmits the SCAN_REPORT message including the SINRs of the scanned neighbor BSs to the BS 1050 at step 1023. The MSS 1000 transmits the SCAN_REPORT message to the BS 1050, and scans pilot SINRs of the BS 1050 and neighbor BSs according to parameters contained in the SCANNING_IE message at step 1025. The MSS 1000 reports pilot SINRs of the BS 1050 and neighbor BSs to the BS 1050 only in the case of generating the event "a", such that it uses minimum resources for the scan report operation, resulting in increased overall efficiency of system resources.

Figure 11:
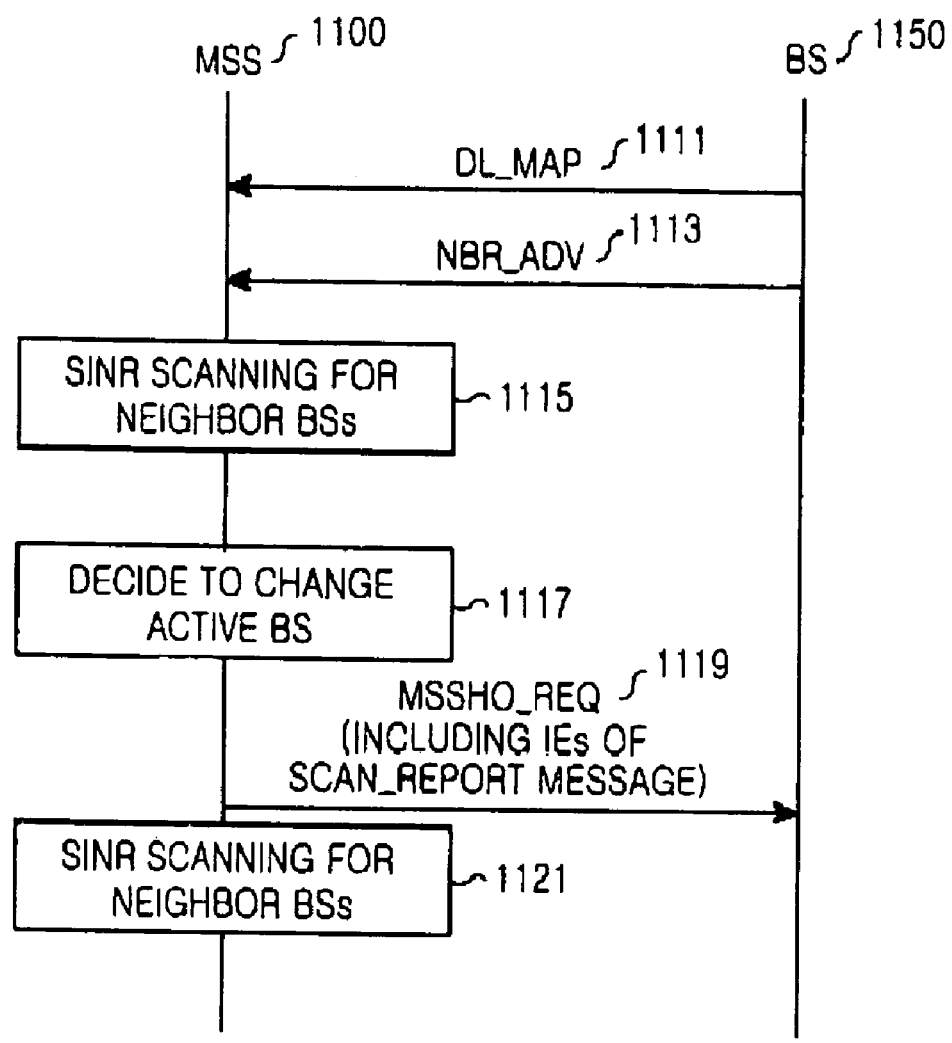
FIG. 11 is a flow chart illustrating a pilot SINR scan report procedure in accordance with a fifth preferred embodiment of the present invention.

FIG. 11 is a flow chart illustrating a pilot SINR scan report procedure in accordance with a fifth preferred embodiment of the present invention. It is assumed that the scan report method is adapted to the scan report method based on the event "b" occurrence in FIG. 11.

Referring to FIG. 11, the BS 1150 transmits a DL_MAP message including the SCAN_REPORT_IE message to the MSS 1100 at step 1111. The SCAN_REPORT_IE message includes the same parameters as in Table 14. The scan report method is based on the occurrence of the event "b", such that the Event "b" mode value is determined to be a value of 1. The DL_MAP message also includes the SCANNING_IE message for the MSS 1100's scanning operation, and the SCANNING_IE message is shown above in Tables 10 to 12.

The BS 1150 transmits the DL_MAP message including the SCAN_REPORT_IE and SCANNING_IE messages to the MSS 1100, and transmits the NBR_ADV message to the MSS 1100 at step 1113. In this case, the NBR_ADV message is the same as in Table 4 of the prior art, such that its detailed description will herein be omitted.

The MSS 1100, having received the NBR_ADV message including the information associated with the neighbor BSs from the BS 1150, scans neighbor BSs recognized by the NBR_ADV message (i.e., SINRs of pilot signals transferred from the neighbor BSs) according to parameters contained in the SCANNING_IE message contained in the DL_MAP message at step 1115. It should be noted that SINRs of pilot signals transferred from the neighbor BSs and the SINR of the pilot signal transferred from the BS 1150 to which the MSS 1100 currently belongs are continuously scanned, even though it is not illustrated in FIG. 11.

If the MSS 1100 decides to change its current active BS to another BS while scanning SINRs of pilot signals of the neighbor BSs at step 1117, i.e., if the MSS 1100 decides to change its current active BS to a new BS different from the BS 1150 at step 1117, the MSS 1100 transmits the MSS-HO_REQ message to the BS 1150 at step 1119. In this case, the MSSHO_REQ message must include IEs of the SCAN_REPORT message as described above.

After transmitting the MSSHO_REQ message to the BS 1150, the MSS 1100 re-scans pilot SINRs of neighbor BSs according to parameters contained in the SCANNING_IE message at step 1121. The MSS 1100 reports pilot SINRs of the BS 1150 (i.e., an active BS) and neighbor BSs to the BS 1150 only in the case of generating the event "b", such that it minimizes the amount of resources needed for the scan report operation, resulting in increased overall efficiency of system resources.

As is apparent from the above description, the present invention provides a method for measuring and reporting a channel quality (i.e., a pilot SINR) in the IEEE 802.16e communication system used in a broadband wireless access (BWA) communication system for use with an OFDM/OFDMA scheme. The present invention enables an MSS to scan pilot SINRs of neighbor BSs even though there is no request from the MSS. Therefore, if the active BS for transmitting a desired service to the MSS is changed to another BS due to the MSS's mobility, the present invention performs a handover function associated with the changed active BS according to pilot SINR scanning result data of the MSS.

Although preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A method for reporting channel quality by an MSS (Mobile Subscriber Station) in a communication system, comprising the steps of:
    a) receiving, from an active BS (Base Station) channel quality measurement information needed for an MSS to measure channel qualities of the active BS and a plurality of neighbor BSs, and receiving channel quality report information defining a report mode needed for the MSS to report the channel qualities of the measured channel qualities of the active BS and the neighbor BSs;
    b) measuring channel qualities of the active BS and the neighbor BSs according to the channel quality measurement information; and
    c) reporting the measured channel qualities of the active BS and the neighbor BSs to the active BS according to the channel quality report information,
    wherein the report mode is one of a plurality of report modes, and the plurality of report modes includes a first report mode and a second report mode, wherein the first report mode and the second report mode include information on the time at which the measured channel qualities of the active BS and the neighbor BSs are reported, wherein the channel quality report time of the first report mode is a predetermined setup period, wherein the channel quality report time of the second report mode identifies a specific time at which a magnitude order of SINRs (Signal to Interference and Noise Ratios) of individual reference channel signals measured at step (b) is different from other magnitude orders of SINRs of reference channel signals of the active BS and the neighbor BSs measured previously.

2. The method as set forth in claim 1, wherein the channel quality measurement information includes a measurement start time at which a channel quality measurement operation begins, and a measurement duration for executing the channel quality measurement operation during which the channel quality measurement operation is carried out.

3. The method as set forth in claim 1, further comprising:
    d) detecting a need for change of the channel quality measurement information, and transmitting a change request of the channel quality measurement information including a new channel quality measurement information to be changed to the active BS.

4. A method for reporting channel quality by an MSS (Mobile Subscriber Station) in a communication system, comprising the steps of:
    a) receiving, from an active BS (Base Station) channel quality measurement information needed for an MSS to measure channel qualities of the active BS and a plurality of neighbor BSs, and receiving channel quality report information defining a report mode needed for the MSS to report the channel qualities of the measured channel qualities of the active BS and the neighbor BSs;
    b) measuring channel qualities of the active BS and the neighbor BSs according to the channel quality measurement information; and
    c) reporting the measured channel qualities of the active BS and the neighbor BSs to the active BS according to the channel quality report information,
    wherein step (b) for measuring the channel qualities of the active BS and the neighbor BSs comprises:
    b1) receiving reference channel signals received from the active BS and the neighbor BSs; and
    b2) measuring SINRs of the reference channel signals from the active BS and the neighbor BSs, and
    wherein the report mode includes information on the time at which the measured channel qualities of the active BS and the neighbor BSs are reported, the channel quality report time is a specific time during which an SINR(Signal to Interference and Noise Ratio) of a reference channel signal received from the active BS is determined to be less than either one of the SINRs of the reference channel signals received from the neighbor BSs, such that a determined state is maintained during a predetermined time.

5. The method as set forth in claim 4, wherein step (c) comprises:
   c1) transmitting a handover request signal to a neighbor BS which has a reference channel's SINR higher than that of the active BS during the predetermined time.

6. The method as set forth in claim 4, wherein the channel quality measurement information includes a measurement start time at which a channel quality measurement operation begins, and a measurement duration for executing the channel quality measurement operation during which the channel quality measurement operation is carried out.

7. The method as set forth in claim 4, further comprising:
   d) detecting a need for change of the channel quality measurement information, and transmitting a change request of the channel quality measurement information including a new channel quality measurement information to be changed to the active BS.

8. A method for reporting channel quality in a communication system, comprising the steps of:
   a) transmitting channel quality measurement information needed for an MSS (Mobile Subscriber Station) to measure channel qualities of an active BS (Base Station) and a plurality of neighbor BSs, and channel quality report information defining a report mode needed for the MSS to report the measured channel qualities of the active BS and the neighbor BSs, from the active BS to the MSS;
   b) measuring, by the MSS, channel qualities of the active BS and the neighbor BSs according to the channel quality measurement information; and
   c) transmitting the measured channel qualities of the active BS and the neighbor BSs, from the MSS to the active BS, according to the channel quality report information,
   wherein the report mode is one of a plurality of report modes, and the plurality of report modes includes a first report mode and a second report mode, wherein the first report mode and the second report mode include information on the time at which the measured channel qualities of the active BS and the neighbor BSs are reported, wherein the channel quality report time of the first report mode is a predetermined setup period, wherein the channel quality report time of the second report mode identifies a specific time at which a magnitude order of SINRs (Signal to Interference and Noise Ratios) of individual reference channel signals measured at step (b) is different from other magnitude orders of SINRs of reference channel signals of the active BS and the neighbor BSs measured previously.

9. The method as set forth in claim 8, wherein the channel quality measurement information includes a measurement start time at which a channel quality measurement operation begins, and a measurement duration for executing the channel quality measurement operation during which the channel quality measurement operation is carried out.

10. The method as set forth in claim 8, further comprising:
    d) detecting, by the MSS, a need for a change of the channel quality measurement information, and transmitting, by the MSS, a change request of the channel quality measurement information including a new channel quality measurement information to be changed to the active BS.

11. A method for reporting channel quality in a communication system, comprising the steps of:
    a) transmitting channel quality measurement information needed for an MSS (Mobile Subscriber Station) to measure channel qualities of an active BS (Base Station) and a plurality of neighbor BSs, and channel quality report information defining a report mode needed for the MSS to report the measured channel qualities of the active BS and the neighbor BSs, from the active BS to the MSS;
    b) measuring, by the MSS, channel qualities of the active BS and the neighbor BSs according to the channel quality measurement information; and
    c) reporting the measured channel qualities of the active BS and the neighbor BSs, from the MSS to the active BS, according to the channel quality report information,
    wherein step (b) for measuring the channel qualities of the active BS and the neighbor BSs comprises:
    b1) receiving, by the MSS, reference channel signals received from the active BS and the neighbor BSs; and
    b2) measuring, by the MSS, SINRs (Signal to Interference and Noise Ratios) of the reference channel signals from the active BS and the neighbor BSs, and
    wherein the report mode includes information on the time at which the measured channel qualities of the active BS and the neighbor BSs are reported, the channel quality report time is a specific time during which an SINR of a reference channel signal received from the active BS is determined to be lower than either one of the SINRs of the reference channel signals received from the neighbor BSs, such that a determined state is maintained during a predetermined time.

12. The method as set forth in claim 11, wherein step (c) comprises:
    c1) transmitting, by the MSS, a handover request signal to a neighbor BS which has a reference channel SINR greater than that of the active BS during the predetermined time.

13. The method as set forth in claim 11, wherein the channel quality measurement information includes a measurement start time at which a channel quality measurement operation begins, and a measurement duration for executing the channel quality measurement operation during which the channel quality measurement operation is carried out.

14. A method for reporting MSS (Mobile Subscriber Station) scanning results to an active BS (Base Station) in a communication system, comprising the steps of:
    a) receiving at the MSS from the active BS a message requesting the MSS to scan and measure at least one channel quality of the active BS and at least one neighbor BS, said message defining reporting parameters needed for the MSS to report the at least one channel quality to the active BS;
    b) measuring the at least one channel quality of the active BS and of the at least one neighbor BS according to the message; and
    c) reporting the at least one channel quality of the active BS and of the at least one neighbor BS to the active BS according to the reporting parameters,
    wherein the reporting parameters include an report mode, and the report mode is one of a plurality of report modes, and the plurality of report modes includes a first report mode, a second report mode, and a third report mode, wherein the first report mode, the second report mode, and the third report mode include information on the time at which the measured channel qualities of the active BS and the neighbor BSs are reported, wherein the channel quality report time of the first report mode is a predetermined setup period, wherein the channel quality report time of the second report mode identifies a specific time at which a magnitude order of SINRs (Signal to Interference and Noise Ratios) of individual reference channel signals measured at step (b) is different from other magnitude orders of SINRs of reference channel signals of the active BS and the neighbor BSs measured previously, wherein the channel quality report time of the third report mode is a specific time during which an SINR of a reference channel signal received from the active BS is determined to be lower than either one of the SINRs of the reference channel signals received from the neighbor BSs, such that a determined state is maintained during a predetermined time.

15. The method of claim 14, wherein the message is sent from the active BS in response to a request from the MSS for scanning information.

16. The method as set forth in claim 11, further comprising:
   d) detecting, by the MSS, a need for a change of the channel quality measurement information, and transmitting, by the MSS, a change request of the channel quality measurement information including a new channel quality measurement information to be changed to the active BS.

* * * * *